(12) United States Patent
Loeffler et al.

(10) Patent No.: US 9,109,519 B2
(45) Date of Patent: Aug. 18, 2015

(54) METHOD FOR CONTROLLING AIR SYSTEM STATES IN AN INTAKE MANIFOLD OF AN INTERNAL COMBUSTION ENGINE

(75) Inventors: Axel Loeffler, Backnang (DE); Wolfgang Fischer, Gerlingen (DE); Roland Karrelmeyer, Bietigheim-Bissingen (DE); Gerald Graf, Gaertringen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 358 days.

(21) Appl. No.: 13/578,337

(22) PCT Filed: Feb. 3, 2011

(86) PCT No.: PCT/EP2011/051539
§ 371 (c)(1),
(2), (4) Date: Nov. 7, 2012

(87) PCT Pub. No.: WO2011/098387
PCT Pub. Date: Aug. 18, 2011

(65) Prior Publication Data
US 2013/0054113 A1    Feb. 28, 2013

(30) Foreign Application Priority Data
Feb. 10, 2010   (DE) .......................... 10 2010 001 738

(51) Int. Cl.
*F02D 41/14*    (2006.01)
*F02D 41/00*    (2006.01)
(Continued)

(52) U.S. Cl.
CPC ............ *F02D 41/0002* (2013.01); *F02D 41/14* (2013.01); *F02D 13/0223* (2013.01); *F02D 41/18* (2013.01); *F02D 2041/001* (2013.01); *F02D 2041/0012* (2013.01); *F02D 2041/0017* (2013.01); *Y02T 10/42* (2013.01)

(58) Field of Classification Search
CPC ... F02D 41/002; F02D 41/18; F02D 13/0223; F02D 2041/001; F02D 2041/0012; F02D 2041/0017
USPC ............. 701/103, 108, 101, 102; 123/568.14, 123/568.13, 568.19, 90.15, 399
See application file for complete search history.

(56) References Cited

U.S. PATENT DOCUMENTS 7,231,905 B1 *   6/2007   Haskara et al. ............... 123/435
2009/0048765 A1 *   2/2009   Kang et al. .................... 701/108
(Continued)

FOREIGN PATENT DOCUMENTS

| EP | 1 378 643 | 1/2004 |
| JP | 2008-280875 | 11/2008 |
| WO | WO 2011/082919 | 7/2011 |

OTHER PUBLICATIONS

International Search Report, PCT International Application No. PCT/EP2010/065532, dated Apr. 6, 2011.
(Continued)

*Primary Examiner* — Mahmoud Gimie
(74) *Attorney, Agent, or Firm* — Kenyon & Kenyon LLP

(57) ABSTRACT

A method for controlling at least one air system state in an intake manifold of an internal combustion engine, at least one control variable which influences the at least one air system state being predefined with the aid of an actuator; at least one control variable limitation of the actuator is taken into account in the control.

20 Claims, 2 Drawing Sheets

(51) Int. Cl.
  *F02D 41/18* (2006.01)
  *F02D 13/02* (2006.01)

(56) References Cited

U.S. PATENT DOCUMENTS

| | | |
|---|---|---|
| 2009/0229564 A1 | 9/2009 | Kang et al. |
| 2009/0234560 A1 | 9/2009 | Rayl et al. |
| 2011/0132316 A1* | 6/2011 | Ramappan et al. ............ 123/295 |
| 2011/0283972 A1* | 11/2011 | Wermuth et al. ......... 123/406.12 |

OTHER PUBLICATIONS

Ravi et al., "Model Based Control of Exhaust Recompression HCCI," *Proceedings of the Fifth IFAC Symposium on Advances in Automotive Control*, 2007.

Shaver et al., "Decoupled Control of Combustion Timing and Work Output in Residual-Affected HCCI Engines," *Proceedings of the 2005 American Control Conference*, 2005.

* cited by examiner

METHOD FOR CONTROLLING AIR SYSTEM STATES IN AN INTAKE MANIFOLD OF AN INTERNAL COMBUSTION ENGINE

FIELD OF THE INVENTION

The present invention relates to a method for controlling air system states in an intake manifold of an internal combustion engine.

BACKGROUND INFORMATION

There are various conventional combustion processes for internal combustion engines. The present invention is directed to controlling and regulating the so-called HCCI combustion process for gasoline engines (homogeneous charge compression ignition, also referred to as gasoline HCCI or controlled auto ignition, CAI). HCCI refers to a lean combustion process which has the goal of demonstrating a significant fuel consumption reduction of 10%-15% in the motor vehicle (due to dethrottling of the engine operation and a thermodynamically advantageous combustion) without significant untreated nitrogen oxide emissions (the three-way-catalytic converter does not have a nitrogen-reducing effect during lean operation), and thus also not having to accept additional costs for exhaust aftertreatment.

Since gasoline and the compression ratio of a gasoline engine are designed in such a way that auto ignitions (knocking) are avoided to the greatest possible extent, the thermal energy which is necessary for the HCCI process must be provided by a different source. This may take place in various ways such as retention or back-suction of the hot internal residual gas or heating of the fresh air, for example.

Carrying out an HCCI combustion process requires a number of functionalities of the internal combustion engine, in particular a direct injection, a (partially) variable valve gear (e.g., phase variability and two-point lift) as well as feedback from the combustion (e.g., combustion chamber pressure, structure-borne noise, ion current, high-resolution rotational speed signal, etc.).

An important aspect in this context is the engine control, which must be expanded by special functions both for the steady-state control and regulation of the HCCI combustion and for the dynamic control and regulation (load change and switching between operating modes). The task of the steady-state control and regulation is to maintain/set the operating point, the cylinder equalization, and the compensation for environmental influences. The task of the dynamic control and regulation is to make the fastest possible load changes possible and to not allow knocking or misfiring combustions.

The HCCI combustion process requires a careful coordination between the control and regulation of the combustion itself and the air system states in the intake manifold, in order to simultaneously achieve the described consumption advantages and acceptable pollutant emissions.

A corresponding control procedure is described in the application "Method for controlling an HCCI combustion in a reactor of an internal combustion engine" which was filed by the applicant on the same day and to whose entire content reference is made and whose content is regarded here as disclosed. In this application, a control method for an HCCI combustion is described which may be used as the starting point of the present invention and upon which the present invention may build for optimization. In particular, during the dynamic HCCI operation (e.g., load change) suboptimal operation phases temporarily occur, since the control actions are each subject to a different delay behavior for hardware reasons. This is due to the fact, among other things, that the air system states follow the intake manifold dynamics and the phase controllers are subject to dead times and are rate-limiting controlled.

Similar problems arise when switching between processes, for example from an HCCI process to an SI process (spark ignition) and vice versa. A corresponding switchover method is described in the application "Method for switching between an HCCI combustion and an SI combustion in a reactor of an internal combustion engine" which was filed by the applicant on the same day and to whose entire content reference is made and whose content is regarded here as disclosed. In this application, a switchover method is described which may be used as the starting point of the present invention and upon which the present invention may build for optimization. During an HCCI to SI transition, it is namely necessary, on the one hand, to eject the internal residual gas as quickly as possible, ideally within one ejection sequence, and, on the other hand, it must be prevented that the air/fuel mixture becomes excessively lean when the combustion chamber volume, which becomes available due to the residual gas ejection, is filled with fresh air.

It is thus desirable to control the air system states in the intake manifold so that possibly no misfiring or knocking combustions occur in the reactor of the internal combustion engine.

SUMMARY

In accordance with the present invention, a time-optimized control and regulation of these air system states may be crucial to the overall dynamics of the system due to a high sensitivity of the HCCI combustion with regard to the air system states in the intake manifold. In accordance with the present invention, a, for example, model-based approach, is used in which control variable limitations are taken into consideration. The present invention thus retains the consumption advantages ascertained in steady-state operation and ensures a maximum torque dynamics in combination with a corresponding control and regulation of the combustion, without resulting in knocking or misfiring.

Advantageously, the at least one control variable limitation includes a change of the control variable per time unit executable maximally and/or minimally by the actuator, and/or a value of the control variable providable maximally and/or minimally by the actuator. For example, valves have maximally adoptable boundary states, and the valve dynamics is also subject to certain inertias. Consequently, control commands do not immediately propagate. The control may be improved by taking into account the real behavior of the actuators.

Advantageously, a maximally and/or minimally possible change rate of the at least one air system state is determined on the basis of the considered control variable limitation. In one preferred embodiment, the at least one control variable may then be determined for the actuator on the basis of the determined maximally and/or minimally possible change rate of the at least one air system state. In this way, a control variable or a control variable characteristic is determined which very closely approaches the actual characteristic of the actuator.

According to one preferred embodiment of the present invention, the control of an HCCI combustion process is carried out. A corresponding control method is described in the application "Method for controlling an HCCI combustion in a reactor of an internal combustion engine" which was filed by the applicant on the same day and to whose entire content reference is made and whose content is regarded here as a disclosure which is used in accordance with the present invention. The present invention is not limited to the HCCI process, but may be applied in all combustion processes in which an abrupt or rapid change in the residual gas rate in the intake manifold is required. This is, for example, the case in the spray-guided stratified combustion process.

According to another preferred embodiment of the present invention, a switchover from an HCCI to an SI combustion process is carried out. A corresponding switchover method is described in the application "Method for switching between an HCCI combustion and an SI combustion in a reactor of an internal combustion engine" which was filed by the applicant on the same day and to whose entire content reference is made and whose content is regarded here as a disclosure which is used in accordance with the present invention. The present invention is not limited to the HCCI and the SI switchover processes. The present invention may rather be used in all operating point changes which require an abrupt or rapid change in the residual gas rate in the intake manifold.

An arithmetic unit according to the present invention, e.g., a control unit of a motor vehicle, is designed to carry out a method according to the present invention, in particular from a programming point of view.

It is also advantageous to implement an example method according to the present invention in the form of software, since this is particularly cost-effective, in particular when an executing control unit is used for other tasks and is thus present anyway. Suitable data carriers for providing the computer program are, in particular, discs, hard drives, flash memories, EEPROMs, CD-ROMs, DVDs, and many others. It is also possible to download a program via computer networks (Internet, Intranet, etc.).

One central aspect with regard to HCCI is the time-optimized guidance of air system variables p22 (intake manifold pressure) and r22EG (residual gas rate in the intake manifold). This already applies to the steady-state HCCI operation but particularly in the case of an operating mode switchover from SI to HCCI, for example, and a change in the load requirement (dynamic operation). As control variables, at least the (relative) opening of the throttle valve and the (relative) opening of the EGR valve are available; for these control variables, the method is illustrated in the following as an example without reservation.

The intake manifold is described by the following differential and algebraic equations:

$$\frac{dp_{22}}{dt} = \frac{(\kappa_{Mix} - 1)}{V_{22}} \left( \dot{H}_{Throttle} + \dot{H}_{EGR-valve} - \dot{H}_{Enginela} \right) \quad (1)$$

$$\frac{dm_{22Air}}{dt} = \dot{m}_{Throttle} + (1 - r_{3EG})\dot{m}_{EGR-valve} - (1 - r_{22EG})\dot{m}_{Enginela} \quad (2)$$

$$\frac{dm_{22EG}}{dt} = r_{3EG}\dot{m}_{EGR-valve} - r_{22EG}\dot{m}_{Enginela}$$

$$T_{22} = \frac{p_{22}V_{22}}{m_{Mix}R_{Mix}} \quad (3)$$

$$r_{22EG} = \frac{m_{22EG}}{m_{Mix}} = \frac{m_{22EG}}{m_{22Air} + m_{22EG}} \quad (4)$$

$$c_{p\_Mix} = (1 - r_{22EG})c_{p\_Air} + r_{22EG}c_{p\_EG} \text{ und} \quad (5)$$
$$c_{v\_Mix} = (1 - r_{22EG})c_{v\_Air} + r_{22EG}c_{v\_EG}$$

$$\kappa_{Mix} = \frac{c_{p\_Mix}}{c_{v\_Mix}} \text{ und } R_{Mix} = c_{p\_Mix} - c_{v\_Mix}$$

Here, p describes a pressure, T a temperature, m a gas mass, r a ratio (residual gas mass to total gas mass), dH/dt an enthalpy flow, and the indices 22 and 3 describe the intake manifold volume or the exhaust gas volume. Cp and cv refer to the specific heat capacity at constant pressure or constant volume, kappa refers to the polytropic exponent and R to the gas constant.

Furthermore, the throttle and the EGR valve are described with the aid of the throttle equation:

$$\frac{dm}{dt} = A_{eff}(t) \cdot p_{up} \cdot \sqrt{\frac{2}{T_{up}R_{up}}} \cdot \Psi_x(\pi) \quad (6)$$

$$\frac{dH}{dt} = c_{p\_up} \cdot \dot{m} \cdot T_{up} \quad (7)$$

$$\Psi_x(\pi) = \sqrt{\frac{\kappa_{up}}{\kappa_{up} - 1}} \cdot \sqrt{\pi^{-\frac{2}{\kappa_{up}}} - \pi^{-\frac{\kappa_{up}+1}{\kappa_{up}}}} \quad mit \; \pi = \frac{p_{up}}{p_{down}} \quad (8)$$

Here, dm/dt is the mass flow and dH/dt the associated enthalpy flow via the throttle, and PSI is the flow-through function which is a function of pressure ratio pi upstream and downstream from the throttle and of polytropic exponent kappa.

The effective area Aeff is variable and is ascertained applicatively as a function of an opening percentage value (THROp or EGRvOp) and is advantageously plotted in a characteristics curve.

According to one preferred specific embodiment, equation (1) is solved according to dm/dt_Thr, i.e., the mass flow via the throttle, by using equation (7) and by assuming that the instantaneous enthalpy flows via the EGR valve and into the engine are known:

$$\dot{m}_{throttle} = \frac{1}{c_{p1}T_1} \left[ \frac{V_{22}\dot{p}_{22}^{des}}{(\kappa_{22} - 1)} - \dot{H}_{EGR-valve} - \dot{H}_{Enginela} \right]$$

The desired change of intake manifold pressure dp/dt_22_des results from the system deviation (p22_des−p22_act) divided by the sampling interval. The latter usually corresponds to the smallest reasonable averaging interval, i.e., a combustion (four cylinders: 180° KW) in an engine, since it is not desirable to also control the oscillations occurring due to the intake processes.

Now, it should also be taken into account that the throttle and the EGR valve are subject to control variable limitations (minimum 0%, maximum 100%). This takes place by dynamically delimiting the rate of the desired change according to equation 1, the enthalpy/mass flows via the EGR valve and into the engine (dH/dt_THR_max results at 100%, dH/dt_ THR_min=0 at 0%) being assumed as given:

$$\dot{p}_{22}^{max} = \frac{(\kappa_{Mix} - 1)}{V_{22}} \left( \dot{H}_{Throttle}^{max} + \dot{H}_{EGR-valve} - \dot{H}_{Enginela} \right)$$

$$\dot{p}_{22}^{min} = \frac{(\kappa_{Mix} - 1)}{V_{22}} \left( \dot{H}_{EGR-valve} - \dot{H}_{Enginela} \right)$$

The change rate thus obtained ensures the time optimization.

For the flow via the EGR valve the analog result is:

$$\dot{m}_{EGR-valve} = \frac{1}{r_{3EG} - r_{22EG}^{desl}} [r_{22EG}^{des} m_{22Total} + r_{22EG}^{des} \dot{m}_{Throttle}] \quad 5$$

dr/dt_22EG_des is in turn delimited by the following minimal and maximal values with the aid of a dynamic rate limitation:

$$r_{22EG}^{max} = \frac{1}{m_2} [(r_{3EG} - r_{22EG}) \dot{m}_{EGR-valve}^{max} - r_{22EG} \dot{m}_{Throttle}]$$

$$r_{22EG}^{min} = \frac{1}{m_2} [-r_{22EG} \dot{m}_{Throttle}]$$

Equation 6 and inverse Aeff (Op) characteristics curve is ultimately used to calculate opening percentage values to be commanded for the throttle valve and the EGR valve from the setpoint mass flows calculated in this way.

In one simple embodiment, the two controllers may be designed as SISO controllers, i.e., their coupling is neglected. A coupling may, for example, be taken into account in that both controllers are connected in series delayed by one calculation interval, which has proven to be sufficient in practice.

The prerequisite for this embodiment of the method is that either all the mass flows, masses, temperatures, and pressures involved may be measured very accurately and without time delay or that the corresponding values may be obtained from a model of air system and combustion, which runs concurrently online and must in turn be adjusted periodically using the available measured values.

According to another preferred specific embodiment, a control is proposed which is based on a steady-state estimation of the EGR rate in the intake manifold. The following measured variables must be available: p1 (upstream from throttle), p22, p3, T1, and TEGR (temperature of the exhaust gas downstream from the EGR cooler). From the equations (2), the following results in the steady-state case (no change in the gas masses) for the EGR rate in the intake manifold:

$$r_{22EG} = \frac{r_{3EG} \dot{m}_{EGR-valve}}{\dot{m}_{Throttle} + \dot{m}_{EGR-valve}}$$

where the mass flows via the EGR valve and the throttle are calculated from the measured variables with the aid of equation (6). The EGR rate of exhaust gas volume r3 (HCCI represents a lean combustion process, i.e., r3 is usually smaller than 1) is calculated with the aid of the fuel mass flow, known from the control, into engine dm/dt Fuel and with the aid of the gas mass flow via the throttle, yielding:

$$r_{3EG} = \frac{(1 + AFR) \dot{m}_{Fuel}}{\dot{m}_{Throttle} + \dot{m}_{Fuel}}$$

where AFR indicates the stoichiometric air/fuel ratio (~14.5).

The calculation of the opening percentage values for the throttle and the EGR valve occurs by specifying the desired EGR ratio r22EG_des and a boundary condition. The boundary condition is the requirement that the total mass flow into the intake manifold remains constant from one calculation step to the next (k−1 to k):

$$\dot{m}_{ges}(k) = \dot{m}_{ges}(k-1)$$
$$= \dot{m}_{Throttles}(k-1) + \dot{m}_{EGR-valve}(k-1)$$

The intake manifold pressure (GI.1, dp/dt_22=0) may also be kept constant, thus obtaining an alternative expression for dm/dt_ges(k); from then on, the calculation is identical.

Using the desired EGR rate the following is obtained for the EGR mass flow or throttle mass flow in the kth step:

$$\dot{m}_{EGR-valve}^{des}(k) = \frac{r_{22EG}^{des}(k)}{r_3(k-1)} \cdot \dot{m}_{ges}(k) bzw.$$

$$\dot{m}_{Throttle}^{des}(k) = \left(1 - \frac{r_{22EG}^{des}(k)}{r_3(k-1)}\right) \cdot \dot{m}_{ges}(k).$$

Equation (6), the measured variables, and the inverse Aeff (Op) characteristics curve are ultimately used again to calculate opening percentage values to be commanded for the EGR valve and the throttle valve from the setpoint mass flows calculated in this way.

The above-mentioned features and the features explained below are usable not only in the given combination, but also in other combinations or alone without departing from the scope of the present invention.

The present invention is schematically illustrated in the figures on the basis of an exemplary embodiment and is described in greater detail below with reference to the figures.

DETAILED DESCRIPTION OF EXAMPLE EMBODIMENTS

Figure 1:
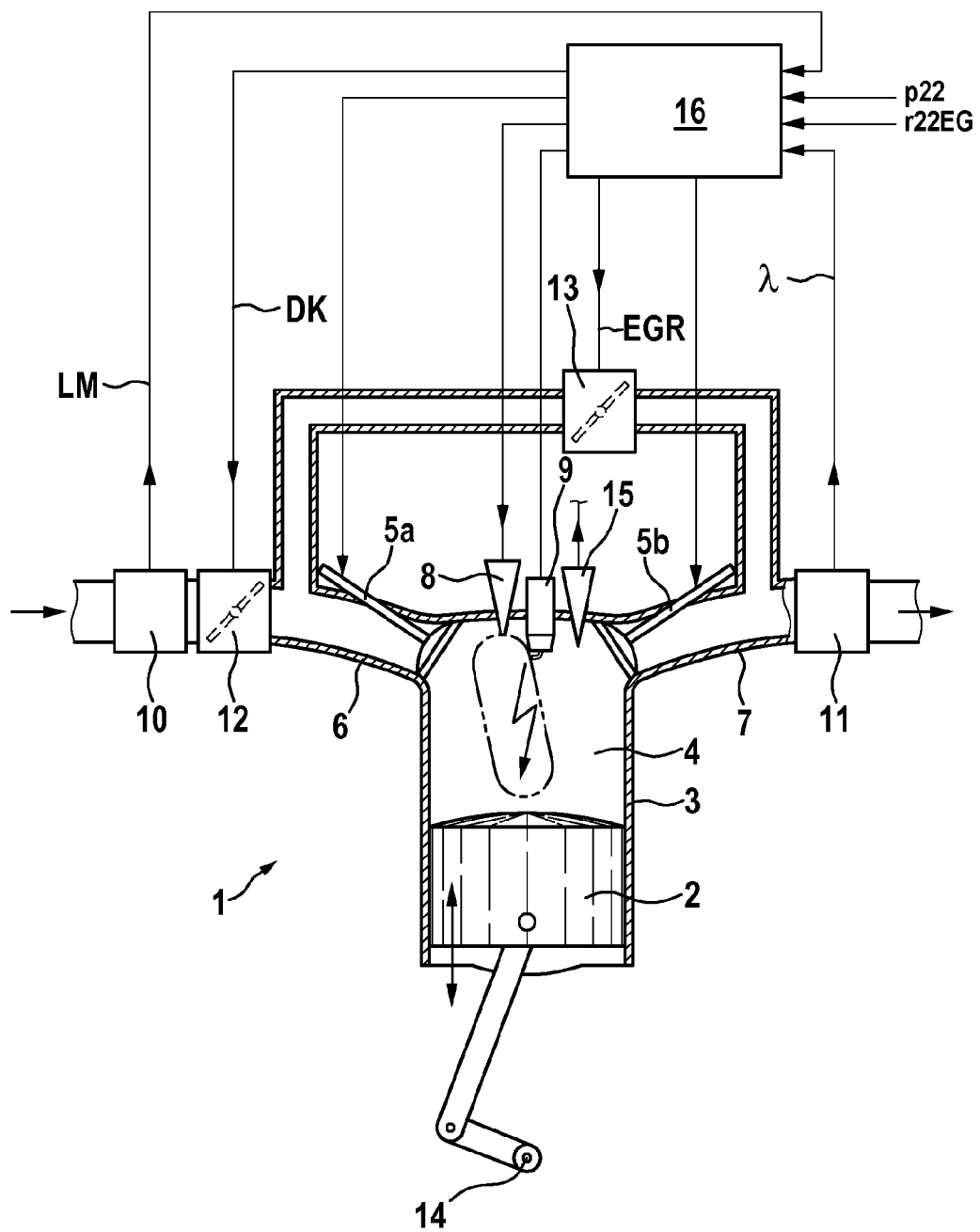
FIG. 1 shows a schematic representation of an internal combustion engine having a control unit.

FIG. 1 shows an internal combustion engine 1 in which a piston 2 is movable up and down in a cylinder 3. Cylinder 3 is provided with a reactor or combustion chamber 4 to which an intake manifold 6 and an exhaust pipe 7 are connected via valves 5a and 5b. Valves 5a, 5b are equipped with an adjustable valve train and are controllable by a control unit 16. Intake manifold 6 is provided with an air mass sensor 10, and exhaust pipe 7 is provided with a lambda sensor 11. Intake manifold 6 is connected to exhaust pipe 7 via an exhaust gas recirculation valve 13 for external exhaust gas recirculation.

For exhaust gas back-suction, intake valve 5a may be controlled in such a way that a part of the exhaust gas flows back into intake manifold 6 due to early opening of intake valve 5a.

For exhaust gas retention, which represents a particularly preferred approach, exhaust valve 5b may be controlled in such a way that a part of the exhaust gas is retained due to early closing of exhaust valve 5b. In this case, intake valve 5a is opened late to prevent the retained exhaust gas from flowing into intake manifold 6.

Furthermore, a controllable injector 8 and a controllable spark plug 9 are connected to combustion chamber 4. In the HCCI process, the spark plug is not used for igniting the fuel/air mixture in the combustion chamber. Instead, an auto ignition takes place. The spark plug is provided for the other operating modes. Furthermore, the combustion chamber has a combustion chamber pressure sensor 15 for measuring the combustion chamber pressure.

Air mass sensor 10 measures the air mass of the fresh air supplied to intake manifold 6 and generates a signal LM as a function thereof. Lambda sensor 11 measures the oxygen content of the exhaust gas in exhaust pipe 7 and generates a signal lambda Λ as a function thereof. Furthermore, an intake manifold pressure p22 and a residual gas rate r22eg are determined and supplied to control unit 16. The determination may, for example, include a measurement. Likewise, the determination may include a model-based calculation, in particular in control unit 16 itself.

In intake manifold 6, a throttle valve 12 is accommodated whose angular position is adjustable with the aid of a signal DK. Exhaust gas recirculation valve 13 is controllable with the aid of a signal EGR. An exhaust system (not shown), including a catalytic converter, for example a 3-way catalytic converter, is situated downstream from lambda sensor 11.

In an HCCI operating mode using exhaust gas retention by internal combustion engine 1, throttle valve 12 is opened as a function of the desired, supplied air mass to generate a lean mixture. Injector 8 injects fuel into combustion chamber 4 during the intermediate compression, caused by the early closing and the late opening of the exhaust and the intake valves, close to the charge cycle TDC (top dead center). The high temperatures prevailing in the combustion chamber result in a rapid evaporation of the fuel and thus in very good mixture formation in combustion chamber 4. During the subsequent intake phase, fresh air is sucked into combustion chamber 4. Then, the fuel/air mixture is compressed during the compression phase until it auto-ignites due to the rising temperature. The expansion of the ignited fuel drives piston 2. The driven piston sets a crankshaft 14 into rotation via which the wheels of the motor vehicle are ultimately driven.

It is understood that an internal combustion engine may have more than one cylinder which are associated with the same crankshaft and the same exhaust pipe and form an exhaust bank.

Control unit 16 is provided for controlling air system states, among other things. For this purpose, control unit 16 is provided with a microprocessor, a program being stored in a storage medium, in particular in a read-only memory (ROM), which is suitable to carry out the entire control and/or regulation of internal combustion engine 1. Control unit (ECU) 16 is designed to carry out an example method according to the present invention.

Control unit 16 is acted upon by input signals which represent the operating variables of the internal combustion engine measured with the aid of sensors. For example, control unit 16 is connected to air mass sensor 10, lambda sensor 11, etc.

Furthermore, control unit 16 is connected, among other things, to an accelerator sensor (not shown). Control unit 16 generates output signals using which the behavior of internal combustion engine 1 may be influenced via actuators according to the desired control and/or regulation. For example, control unit 16 is connected to injector 8, valves 5a, 5b, spark plug 9, and throttle valve 12 and generates the signals necessary to control them.

Figure 2:
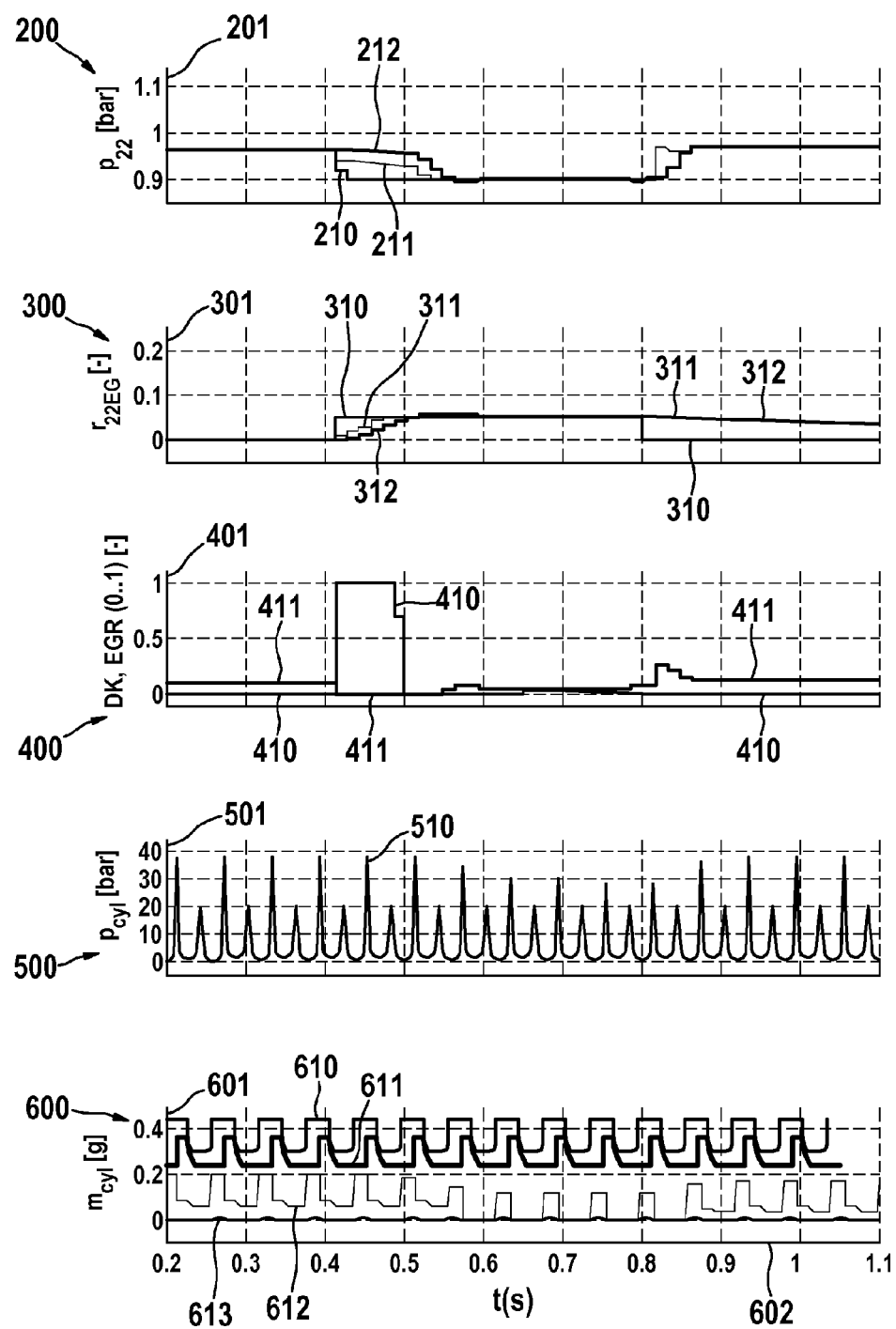
FIG. 2 shows a characteristics curve of an intake manifold pressure, of an EGR rate, of opening percentage values for the throttle and the EGR valve, of a combustion chamber pressure, and of gas masses in the combustion chamber in the case of a control according to one preferred embodiment of the present invention.

A fundamental control strategy of the air system states is explained based on FIG. 2. In FIG. 2, a diagram 200 shows an intake manifold pressure p22 in bar plotted on an ordinate 201; in a diagram 300, an exhaust gas portion r22EG in the intake manifold is plotted on an ordinate 301; in a diagram 400, a throttle valve position DK and an exhaust gas recirculation valve position EGR of 0 (closed) to 1 (completely open) are plotted on an ordinate 401; in a diagram 500, a combustion chamber or a reactor pressure $p_{Cyl}$ in bar is plotted on an ordinate 501; and in a diagram 600, a gas mass $m_{Cyl}$ in grams is plotted on an ordinate 601 against time t in seconds plotted on an abscissa 602.

A desirable pressure characteristics curve, without taking into account the control variable limitations, is identified with reference numeral 210. A desirable pressure characteristics curve which takes into account the control variable limitations is identified with reference numeral 211, and the pressure characteristics curve resulting in reality is identified with reference numeral 212. Accordingly, a desirable characteristics curve of the residual gas portion, without taking into account the control variable limitations, is identified with reference numeral 310. A desirable characteristics curve of the residual gas portion which takes into account the control variable limitations is identified with reference numeral 311, and the characteristics curve of the residual gas portion resulting in reality is identified with reference numeral 312.

It is apparent that by taking into account the control variable limitations the desirable characteristics curve satisfactorily approaches the actual characteristics curve.

A characteristics curve of the exhaust gas recirculation valve position is identified with reference numeral 410, and a characteristics curve of the throttle valve position is identified with reference numeral 411. A characteristics curve of the combustion chamber pressure in a cylinder is identified with reference numeral 510, a total mass characteristics curve with reference numeral 610, an exhaust mass characteristics curve with reference numeral 611, an air mass characteristics curve with reference numeral 612, and a fuel mass characteristics curve with reference numeral 613.

What is claimed is:

1. A method for controlling at least one air system state in an intake manifold of an internal combustion engine, the method comprising:
   predefining at least one control variable which influences the at least one air system state with the aid of at least one actuator, wherein the at least one actuator includes at least one of a throttle valve and an exhaust gas recirculation (EGR) valve;
   controlling at least one of an intake manifold pressure and a residual gas rate in the intake manifold; and
   taking into account at least one control variable limitation of the at least one actuator in the control, wherein the at least one actuator is subject to the control variable limitations by dynamically delimiting the rate of the desired change, enthalpy/mass flows via the EGR valve and into the engine being assumed as given, so that the change rate thus obtained ensures a time optimization.

2. The method as recited in claim 1, wherein the at least one control variable limitation includes a change of the control variable per time unit executable at least one of maximally and minimally by the actuator.

3. The method as recited in claim 1, wherein the at least one control variable limitation includes a value of the control variable providable at least one of maximally and minimally by the actuator.

4. The method as recited in claim 1, wherein at least one of a maximally and a minimally possible change rate of the at least one air system state is determined on the basis of the control variable limitation.

5. The method as recited in claim 4, wherein the at least one control variable is determined for the actuator based on the determined at least one of maximally and minimally possible change rate of the at least one air system state.

6. The method as recited in claim 1, wherein the control variables include an opening of the throttle valve, an opening of the exhaust gas recirculation valve, and at least one of an opening angle of an intake valve, and a closing angle of the intake valve.

7. The method as recited in claim 6, wherein instantaneous enthalpy flows via the exhaust gas recirculation valve and into the reactor are taken into account.

8. The method as recited in claim 6, wherein a steady-state estimation of the exhaust gas recirculation rate in the intake manifold is taken into account.

9. The method as recited in claim 6, wherein a combustion process which requires an abrupt change in a residual gas rate in the intake manifold is controlled.

10. The method as recited in claim 9, wherein an operating point change is carried out by abruptly changing the residual gas rate in the intake manifold, including a switchover from an HCCI to an SI combustion process.

11. A control unit for controlling at least one air system state in an intake of an internal combustion engine, comprising:
a processing unit configured to predefine at least one control variable which influences the at least one air system state with the aid of at least one actuator, which includes at least one of a throttle valve and an exhaust gas recirculation (EGR) valve, to control at least one of an intake manifold pressure and a residual gas rate in the intake manifold, and to take into account at least one control variable limitation of the actuator in the control;
wherein the at least one actuator is subject to the control variable limitations by dynamically delimiting the rate of the desired change, enthalpy/mass flows via the EGR valve and into the engine being assumed as given, so that the change rate thus obtained ensures a time optimization, and wherein the control unit is configured to be connected to the internal combustion engine.

12. The control unit as recited in claim 11, wherein the at least one control variable limitation includes a change of the control variable per time unit executable at least one of maximally and minimally by the actuator.

13. The control unit as recited in claim 11, wherein the at least one control variable limitation includes a value of the control variable providable at least one of maximally and minimally by the actuator.

14. The control unit as recited in claim 11, wherein at least one of a maximally and a minimally possible change rate of the at least one air system state is determined on the basis of the control variable limitation.

15. The control as recited in claim 14, wherein the at least one control variable is determined for the actuator based on the determined at least one of maximally and minimally possible change rate of the at least one air system state.

16. The control unit as recited in claim 11, wherein the control variables include an opening of the throttle valve, an opening of the exhaust gas recirculation valve, and at least one of an opening angle of an intake valve, and a closing angle of the intake valve.

17. The control unit as recited in claim 16, wherein instantaneous enthalpy flows via the exhaust gas recirculation valve and into the reactor are taken into account.

18. The control unit as recited in claim 16, wherein a steady-state estimation of the exhaust gas recirculation rate in the intake manifold is taken into account.

19. The control unit as recited in claim 16, wherein a combustion process which requires an abrupt change in a residual gas rate in the intake manifold is controlled.

20. The control unit as recited in claim 19, wherein an operating point change is carried out by abruptly changing the residual gas rate in the intake manifold, including a switchover from an HCCI to an SI combustion process.

* * * * *